(12) United States Patent
Piett et al.

(10) Patent No.: US 8,126,424 B2
(45) Date of Patent: Feb. 28, 2012

(54) PERSONALIZED MESSAGE ESCROW WITH GRAPHICAL ROUTE REPRESENTATION

(75) Inventors: William Todd Piett, Southborough, MA (US); Constantinos Nickolaos Sevdinoglou, Commack, NY (US); Ghen Saito, New York, NY (US)

(73) Assignee: Rave Wireless, Inc., Framingham, MA (US)

( * ) Notice: Subject to any disclaimer, the term of this patent is extended or adjusted under 35 U.S.C. 154(b) by 750 days.

(21) Appl. No.: 12/105,828

(22) Filed: Apr. 18, 2008

(65) Prior Publication Data

US 2009/0191842 A1 Jul. 30, 2009

Related U.S. Application Data

(63) Continuation-in-part of application No. 11/687,818, filed on Mar. 19, 2007.

(60) Provisional application No. 60/784,276, filed on Mar. 20, 2006.

(51) Int. Cl.
*H04M 11/04* (2006.01)

(52) U.S. Cl. ................. 455/404.2; 340/539.13

(58) Field of Classification Search .......... 455/404.1
See application file for complete search history.

(56) References Cited

U.S. PATENT DOCUMENTS

| | | | |
|---|---|---|---|
| 4,643,462 A | 2/1987 | Wallace | |
| 5,710,803 A | 1/1998 | Kowal et al. | |
| 5,787,429 A | 7/1998 | Nikolin | |
| 5,805,670 A | 9/1998 | Pons et al. | |
| 5,808,564 A | 9/1998 | Simms et al. | |
| 6,353,398 B1 | 3/2002 | Amin et al. | |
| 6,560,456 B1 | 5/2003 | Lohtia et al. | |
| 6,600,812 B1 | 7/2003 | Gentillin et al. | |
| 6,643,355 B1 | 11/2003 | Tsumpes | |
| 6,661,340 B1 | 12/2003 | Saylor et al. | |
| 6,696,956 B1 | 2/2004 | Uchida et al. | |
| 6,973,166 B1 | 12/2005 | Tsumpes | |
| 7,026,928 B1 * | 4/2006 | Lane | 340/539.13 |
| 7,038,590 B2 | 5/2006 | Hoffman et al. | |
| 7,046,140 B2 | 5/2006 | Adamczyk et al. | |
| 7,068,189 B2 | 6/2006 | Brescia | |
| 7,130,389 B1 | 10/2006 | Rodkey et al. | |
| 7,149,533 B2 | 12/2006 | Laird et al. | |
| 7,174,005 B1 | 2/2007 | Rodkey et al. | |
| 7,212,111 B2 | 5/2007 | Tupler et al. | |
| 7,312,712 B1 * | 12/2007 | Worrall | 340/573.4 |
| 7,362,852 B1 | 4/2008 | Rodkey et al. | |
| 2001/0026221 A1 | 10/2001 | Toyota | |
| 2002/0102996 A1 | 8/2002 | Jenkins | |
| 2002/0107927 A1 * | 8/2002 | Gallant | 709/206 |
| 2004/0190720 A1 | 9/2004 | Harvey | |
| 2004/0198315 A1 * | 10/2004 | Vellotti | 455/404.1 |
| 2005/0003797 A1 | 1/2005 | Baldwin | |

(Continued)

*Primary Examiner* — Dwayne Bost
*Assistant Examiner* — Joseph Dean, Jr.
(74) *Attorney, Agent, or Firm* — Occhiuti Rohlicek & Tsao LLP

(57) ABSTRACT

Systems, methods, and apparatus, including computer program products, for maintaining a personalized message provided by a personal security service subscriber in an escrow storage during a security period associated with the subscriber; processing itinerary-related information of the personalized message against a dictionary of known physical locations to identify a starting point, a destination point, and a candidate route between the starting point and the destination point; generating a visual representation of the candidate route; and delivering the personalized message, the visual representation of the candidate route, or both, to one or more recipients upon determining an occurrence of a security event during the security period associated with the subscriber.

31 Claims, 2 Drawing Sheets

U.S. PATENT DOCUMENTS

| | | |
|---|---|---|
| 2005/0009536 A1 | 1/2005 | Ito et al. |
| 2005/0170810 A1* | 8/2005 | Choi et al. .................... 455/410 |
| 2006/0263022 A1 | 11/2006 | Han |
| 2007/0072583 A1* | 3/2007 | Barbeau et al. ............ 455/404.2 |
| 2007/0093234 A1 | 4/2007 | Willis et al. |
| 2007/0149214 A1 | 6/2007 | Walsh et al. |
| 2007/0190512 A1 | 8/2007 | Meimer et al. |
| 2008/0188198 A1 | 8/2008 | Patel et al. |

* cited by examiner

PERSONALIZED MESSAGE ESCROW WITH GRAPHICAL ROUTE REPRESENTATION

CROSS-REFERENCE TO RELATED APPLICATIONS

This application is a continuation-in-part of U.S. application Ser. No. 11/687,818, filed Mar. 19, 2007, which claims the benefit of U.S. Provisional Application No. 60/784,276 filed Mar. 20, 2006, and is also related to co-pending U.S. application Ser. No. 12/105,790, entitled "Personalized Message Escrow," filed concurrently with this application, the contents of each application are incorporated herein by reference in its entirety.

BACKGROUND

This description relates to personalized message escrow with graphical route representation.

Cellular telephone systems today typically provide some capability to track the location of users, for example, to determine the location of a user that dials an emergency number (e.g., using E911). In some communities of users, such as students on a university campus, use of cellular telephones has become ubiquitous, with uses using text messaging and other applications to stay connected.

SUMMARY

In general, in one aspect, the invention features a computer-implemented method that includes receiving a first communication indicative of an initiation of a security period associated with a personal security service subscriber; receiving a personalized message provided by the subscriber; maintaining the personalized message in an escrow storage during the security period; processing itinerary-related information of the personalized message against a dictionary of known physical locations to identify a starting point, a destination point, and a candidate route between the starting point and the destination point; generating a visual representation of the candidate route; and delivering the personalized message, the visual representation of the candidate route, or both, to one or more recipients upon determining an occurrence of a security event during the security period associated with the subscriber.

Implementations of the invention may include one or more of the following features.

The personalized message may include content of one or more of the following content forms: text, audio, still images, animation, and video.

The first communication may include valid security service subscriber login information. The first communication may include a signal representative of a time interval selection.

The computer-implemented method may further include associating the personalized message with a security event trigger that is defined in part by the time interval selection.

The occurrence of the security event may correspond to an end condition of the security period. The end condition of the security period may correspond to an expiration of a subscriber-specified timer. The computer-implemented method further includes delivering a warning notification to prompt the subscriber to terminate the security period prior to the expiration of the subscriber-specified timer; and delivering the personalized message, the visual representation of the candidate route, or both, to the one or more predetermined recipients if the subscriber-specified timer expires prior to a receipt of a second communication indicative of a termination of the security period associated with the subscriber. The computer-implemented method further includes identifying a signal representative of a subscriber-initiated emergency notification as a security event trigger; and delivering the personalized message, the visual representation of the candidate route, or both, to the one or more predetermined recipients upon detecting a signal representative of a subscriber-initiated emergency notification. The computer-implemented method further includes identifying each of a plurality of prespecified check in times as a respective security event trigger; and delivering the personalized message, the visual representation of the candidate route, or both, to the one or more predetermined recipients upon detecting a violation of at least one of the plurality of security event triggers. The computer-implemented method further includes processing the itinerary-related information of the personalized message against a dictionary of known physical locations to identify a starting point, a destination point, and a candidate route between the starting point and the destination point; generating an estimated time of arrival based in part on the candidate route; and identifying a due time calculated from the estimated time of arrival as the security event trigger. The computer-implemented method further includes delivering the visual representation of the candidate route to an access terminal associated with the subscriber; and receiving a second communication indicative of a confirmation of the candidate route as a prescribed route to be traversed by the subscriber. The computer-implemented method further includes receiving information identifying an itinerary-related companion; maintaining the information identifying the itinerary-related companion in the escrow storage during the security period; and delivering the information identifying the itinerary-related companion and at least one of the personalized message and the visual representation of the candidate route to the one or more predetermined recipients upon detection of a security event during the security period. The computer-implemented method further includes processing itinerary-related information of the personalized message against one or more directories of candidate identifiers to identify an itinerary-related companion; and delivering the information identifying the itinerary-related companion and at least one of the personalized message and the visual representation of the candidate route to the one or more predetermined recipients upon detection of a security event during the security period. The computer-implemented method further includes delivering profile information associated with the subscriber to the one or more predetermined recipients.

The first communication may be received from one of the following: an access terminal associated with the subscriber and a dedicated access terminal at a physical location associated with the subscriber.

The computer-implemented method may further include receiving a second communication indicative of a termination of the security period associated with the subscriber; and removing the personalized message from the escrow storage. The first communication and the second communication may be received from different access terminals.

Other general aspects include other combinations of the aspects and features described above and other aspects and features expressed as methods, apparatus, systems, computer program products, and in other ways.

Other features and advantages of the invention are apparent from the following description, and from the claims.

DESCRIPTION

In this description, techniques for implementing a personal security service are described in a variety of different contexts and environments. Aspects of the techniques enable a user of the personal security service (referred to as a "subscriber") to initiate a security period (i.e., a closer or open time interval) and record a personalized voice message that includes, for example, itinerary-related information and/or "private" information. Very generally, the personal security service functions as an escrow agent. The personal security service holds and keeps private the personalized message in escrow for delivery to one or more recipients upon satisfaction of at least one message delivery condition during the security period. If none of the message delivery conditions occur during the security period, the personal security service removes the personalized message from escrow. In some implementations, removal of the personalized message from escrow results in a permanent deletion of all copies of the message from storage device(s), while in other implementations, the personalized message is simply labeled as (or otherwise designated as) "inactive." In the following sections of this description, we describe these and other aspects of the techniques in an exemplary context of a university community and an exemplary context of an online dating community. Although the examples below describe the personalized message as a voice message, the techniques are also applicable for holding a personalized message having content of any content form or combination of content forms (e.g., content forms include, but are not limited to, text, audio, still images, animation, and video) in escrow.

1 First University Community Context

A university community is generally comprised of students, faculty members, and staff members, and may be geographically centered on a single campus or geographically dispersed on multiple campuses in different parts of a city, state, or country. A personal security system may be deployed on a university campus to aid the campus' police department in fulfilling its mission to promote and maintain the public safety and security of the university community.

Figure 1:
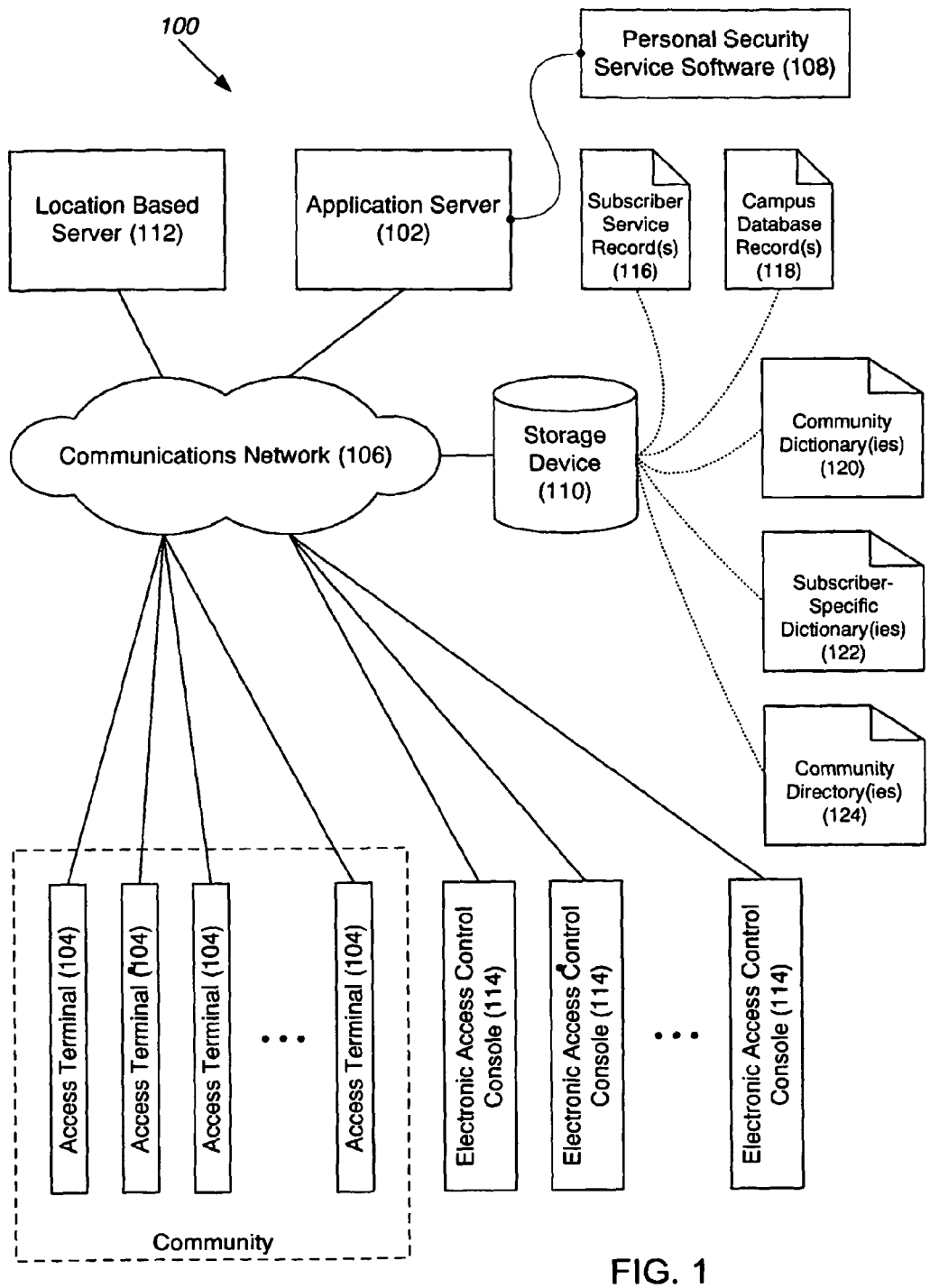
FIG. 1 is a block diagram of a personal security system.

Referring to FIG. 1, in this example, a personal security system 100 includes an application server 102 in communication with end user access terminals 104 through a communications network 106. The application server includes software 108 operable to provide a personal security service ("service") to those members of the university community who have enrolled in the service.

The communications network 106 is a network of devices that use the TCP/IP network protocols to exchange data and can be implemented in a variety of ways. For example, the communications network 106 may include any kind and any combination of networks such as an Internet, a local area network (LAN) or other local network, a private network, a public network, a plain old telephone system (POTS), or other similar wired or wireless networks. The communications network 106 can also include additional elements such as communication links, proxy servers, firewalls or other security mechanisms, Internet Service Providers (ISPs), gatekeepers, gateways, switches, routers, hubs, client terminals, and other elements. Communications through the communications network 106 can include any kind and any combination of communication links such as modem links, Ethernet links, cables, point-to-point links, infrared connections, fiber optic links, wireless links, cellular links, Bluetooth®, satellite links, and other similar links. Communications through the communications network 106 may be secured with a mechanism such as encryption, a security protocol, or other type of similar mechanism.

The end user access terminals 104 may be implemented as a mobile device such as a cellular telephone, a wireless PDA, a handheld gaming device, or a wireless laptop computer, or a stationary device such as a desktop computer, or other fixed device with which wired and/or wireless communication is desired. The access terminals 104 may also include embedded devices such as dedicated security activation and deactivation consoles that include a wired or wireless communications modem. An access terminal 104 may be associated with a specific university community member (e.g., a cellular telephone is associated with a particular student) or a specific group of university community members (e.g., a wireless PDA is associated with officers of a campus police department, and a dedicated security activation and deactivation console is associated with residents of a university dormitory).

In one implementation, the service includes a web-based interface through which a member of the university community provides enrollment information, such as the member's name, physical description (e.g., gender, height, weight, eye color, hair color, and unique physical identifiers, such as a birthmark or tattoo), photograph(s), and cellular telephone number. As part of the enrollment process, the member may be prompted to create a username and/or password, the combination of which is subsequently used by the service to authenticate the identity of the member.

The member may be required to review and agree to terms and conditions of a personal security service agreement in order to use the service. Such terms and conditions may include an explicit consent by the member to allow the service to process, access and/or use information that was provided by the member, for example, during enrollment or otherwise obtained through access of the member's campus database records, such as general records that may include the member's campus residence address, campus work address, permanent home address, next of kin's contact information, affiliation with the university (e.g., student, faculty member, or staff member), and class schedules (e.g., list of classes the member is teaching, enrolled in, or otherwise associated with), and health records that may include the member's medical history, medical condition, drug allergies, and doctor's contact information.

In some implementations, the enrollment information provided by the member is securely stored as a subscriber service record 116 in a database accessible only by the service. In some implementations, the enrollment information is merged into one or more of the member's other campus database records 118. The member's subscriber service record and campus database records may be stored in a single storage device 110 (as depicted in FIG. 1) or across multiple storage devices in electronic communication with the application server 102 through the communications network 106.

Once enrolled, the member of the university community (now known to the personal security service as a subscriber) is provided with instructions on accessing and utilizing the service.

In some examples, the personal security system 100 supports a mode that can be used when a subscriber expects to be at some risk for an upcoming interval of time. For example, a subscriber may need to cross a campus late at night and feel at risk walking along isolated paths. Some examples of such a mode use a timer-based approach. Generally, the subscriber initiates a security period with the personal security service by setting a timer to coincide with the interval of time the subscriber expects to be "at risk." If the subscriber "checks in" before the expiry of the interval, or alternatively in response to a prompt by the service nearing the end of the interval, the subscriber is deemed to be safe. On the other hand, if the subscriber does not check in or does not respond to a prompt, or optionally if the subscriber's mobile access terminal is not accessible from the communications network during the interval, the personal security service may be implemented to notify, by default, the campus police department for that subscriber's community. The notification may include the last known location of the subscriber's mobile access terminal, the voice message that was recorded by the subscriber, for example, that includes itinerary-related information, and information about the subscriber that would be useful to the campus police officers who are sent to investigate the situation.

A sequence of steps for a personal security service subscriber is described in a mobile access terminal example. In each of the following steps, the calling party may interrupt the playback of the voice script at any time.

Step 202: A member of the university community (referred to in the next few steps as the "calling party") uses her cellular telephone to dial a telephone number associated with the service. In some implementations, each community's service is assigned a telephone number that uniquely identifies the community with which the calling party is associated. The public telephone network (within the communications network) queries the personal security system's intelligent call router (ICR) for routing instructions. The ICR determines which of the personal security system's interactive voice response unit (IVRU) should handle the call based on a number of factors, including the number dialed (which is determined using Dialed Number Identification Service (DNIS) information obtained from the public telephone network), the time of day, etc. The ICR provides the public telephone network with information that allows the network to connect the call to the proper IVRU. In particular, the public telephone network uses the information from the ICR to connect the pending call to the appropriate IVRU (e.g., the IVRU associated with a particular one of the university's campuses) and to pass DNIS information and Automatic Number Identification (ANI) information to the IVRU. Using the DNIS information, the IVRU invokes a specific application hosted by the application server.

Step 204: Following step 202, if the DNIS information identifies to the IVRU that the calling party is trying to access the "normal situation" portion of the personal security service, the IVRU uses the ANI information to first determine whether the telephone number of the calling party is associated with a subscriber of the personal security service. If so, the IVRU starts playing a voice script to prompt the calling party for his password. Otherwise, the IVRU starts playing a voice script to prompt the calling party for a username and password combination. The IVRU then passes the received information to the application server, which compares the received information with the subscriber service records stored in its database to determine whether the calling party is a subscriber of the personal security service.

Step 206: Following step 204, when the IVRU receives confirmation that the calling party has entered an invalid username or is calling from a telephone number that is not associated with a subscriber of the service, the IVRU starts playing the following exemplary voice script: "You are not a current subscriber of the personal security service. Please enroll or complete your enrollment for the service by going to www.getrave.com" and terminates the call.

Step 208: Following step 204, when the IVRU receives a confirmation that the calling party has entered a valid username or is calling from a telephone number that is associated with a subscriber of the service, but has entered an invalid password, the IVRU starts playing the following exemplary voice script: "Your password does not match the password we have on file. You may change your password online at www.getrave.com or try again now."

Step 210: Following step 206 or 208, once the IVRU receives confirmation that the calling party is a subscriber of the personal security service, the service determines whether the subscriber has a currently active security period. If so, the IVRU starts playing the voice script of step 216. Otherwise, the IVRU prompts the calling party to initiate a security period by starting to play the following exemplary voice script: "You will now set your alarm. If the alarm expires before you deactivate the alarm, your information and the voice message you are about to record will be sent to the campus police department. Using you touch tone pad, please enter the number of minutes you would like to set the alarm for."

Step 212: Following step 210, the IVRU examines the signals received from the calling party to determine whether the calling party depressed "valid" keys. If the signals are representative of the "*" key or the "#" key, the IVRU starts playing the following exemplary voice script: You entered an invalid time interval." and repeats the voice script of step 210. Otherwise, the IVRU starts playing the following exemplary voice script: "You entered [number of minutes]. If this is correct, press "1" now. If you would like to change the time interval, press "2" now." The IVRU repeats the voice script of step 210 if the calling party depresses the "2" key.

Step 214: Following step 212, if the calling party depressed the "1" key, the IVRU starts playing the following exemplary message: "Your alarm has been set. You will be reminded to deactivate the alarm before it expires. If you would like to deactivate the alarm before then, please call this number again. After the tone, please leave a brief message clearly stating where you are going from and to as well as any other pertinent itinerary-related information, such as the person or persons you are meeting, followed by the pound key." The IVRU records the voice message provided by the calling party, stores the recorded voice message in an escrow account associated with the subscriber, and plays the following exemplary voice script after receipt of a signal representative of the pound key being depressed: "Your voice message has been recorded. If you want to re-record your voice message, please press "1" now. Otherwise, please hang up or press "2" now to terminate the call." The IVRU repeats step 214 as necessary or terminates the call based on the calling party's response.

Step 216. Following step 210, if the service determines that the subscriber has a currently active security period, the IVRU starts playing the following exemplary voice script: "If you would like to deactivate the alarm, please press "1" now. If you are currently in danger, please press "2" now." The IVRU examines the signals received from the calling party and terminates the active security period if the calling party depressed the "1" key. If the calling party depressed any key other than the "1" key or the "2" key, the IVRU repeats the voice script of step 216. If the calling party depressed the "2" key, the IVRU sends a notification to the service to initiate an emergency situation.

Step 218: Following step 202, if the DNIS information identifies to the IVRU that the calling party is trying to access the "emergency situation" personal security service, the IVRU uses the ANI information to first determine whether the telephone number of the calling party is associated with a subscriber of the personal security service, and if so, the service makes determination as to whether the subscriber has a currently active security period. If the subscriber does not have a currently active security period, the service terminates the call and logs it as a "missed call." The service may be implemented to run a set of business rules that takes no further action with respect to the "missed call" log unless the number of "missed call" entries in the log exceeds a predefined threshold within a particular time period. For example, a business rule may be set to trigger the service to initiate an emergency situation if more than three calls from a single subscriber are logged as "missed calls" within 5 minutes. If the subscriber has a currently active security period, the service immediately initiates an emergency situation.

Step 220: Following step 214, prior to the end of the time interval (e.g., 5 minutes prior), the service sends a communication (e.g., a SMS-based message or a voice mail) to the subscriber's mobile device to prompt the subscriber to deactivate the alarm. If the subscriber has not checked back in with the service at the end of the time interval, the service initiates an emergency situation.

Step 222: Following step 216, step 218, or step 220, once an emergency situation is initiated, the service requests location information for the subscriber's mobile device, and if available, the time the location determination was made. Various types of location based systems may be used to aid the personal security service in identifying a location of a mobile access terminal. In one example, the personal security system includes or has associated with it a location based server (LBS) 112, which is able to determine the location of a particular mobile access terminal 128. The application server 102 can query the LBS 112 (e.g., as a software based request over the Internet) to determine the location of a particular mobile access terminal. Different examples of the personal security network make use of one or more types of location determination approaches. One type of location determination approach uses Global Positioning System (GPS) functionality that is built into the mobile access terminal, optionally assisted by fixed elements of the communication network in an Assisted GPS (AGPS) approach. WiFi or Bluetooth techniques may also be used to assist in location determination. Other location determination approaches include advanced forward link trilateralation in which signal transmission time between at least three cell towers is measured. Yet other approaches are based on cell sector identification in a cellular telephone network within the communications network. The location information may take various forms, such as latitude and longitude.

Figure 2:
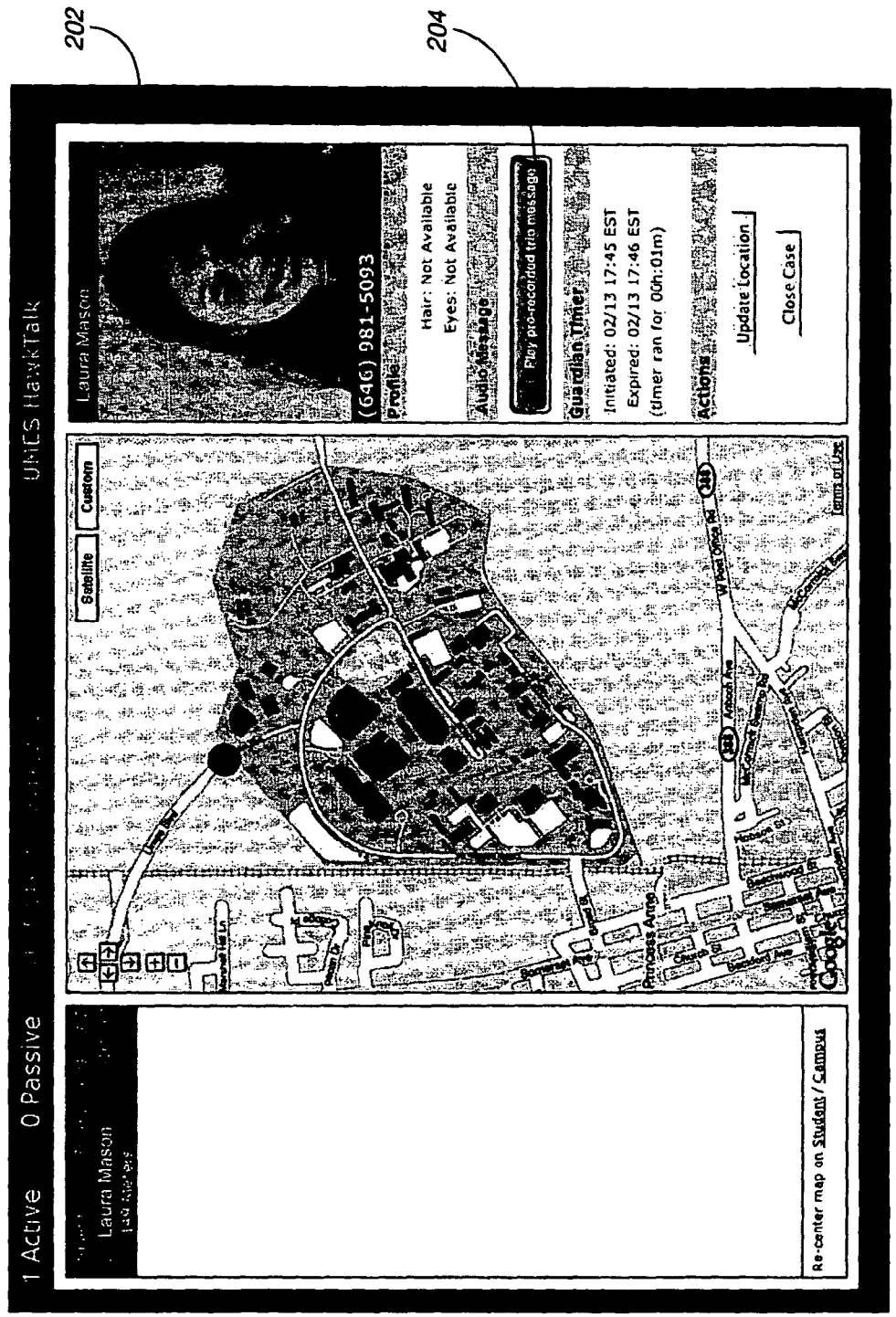
FIG. 2 shows an exemplary screen pop on an end user access terminal.

Step 224: Following step 222, the service accesses the escrow account and forwards to the campus police department the voice message recorded in step 214, the location information obtained in step 222, and some information about the subscriber that may be useful to the campus police officers, for example, the subscriber's name, physical description (e.g., gender, height, weight, eye color, hair color, and unique physical identifiers, such as a birthmark or tattoo), and photograph(s). Referring to FIG. 2, aspects of the forwarded information (e.g., a graphical display with a map showing the subscriber's location (or last known location), a photograph of the subscriber, as well as text-based personal information) may be displayed in a screen pop 202 on an end user access terminal (e.g., desktop computer located at the campus police headquarters and a handheld wireless PDA that is associated with a campus police officer who patrols the campus on bike or foot) associated with the campus police department. The screen pop 202 may be implemented with a "Play pre-recorded voice message" button 204 that enables the campus police officer to listen to the voice message that was recorded in step 214 and use the itinerary-information included in the voice message to identify the likely route traversed by the subscriber and the people the subscriber intended to meet up with. In some implementations, the campus police department will further attempt to interact with the subscriber, for example, by calling the subscriber's mobile access terminal to establish person-to-person communication, and/or by dispatching personnel to the subscriber's location to provide assistance. When appropriate, the security service may notify other security organizations, such as a local police department, to help handle the situation. In other implementations, the security system automatically sets up a call between the campus police department and the subscriber, for example, as soon as the playback of the pre-recorded voice message has ended.

2 Online Dating Context

In this section of the description, we describe aspects of the techniques in an exemplary context of an online dating community.

An online dating community is generally comprised of individuals who are located in geographically overlapping regions of a city, state, or country. Very generally, when an individual signs up with an online dating service, the individual provides personal information, such as the individual's name, email address, and physical location. Through the online dating service, the individual posts a dating profile that includes a screen name, information about the individual and/or the type of person the individual is interested in meeting, and optionally, one or more photographs. In some cases, as part of the sign-up process, the individual may further provide credit card information or some form of payment information.

A personal security service may be deployed by the online dating service as a free or "pay-for-use" safety feature to enhance its subscribers' experience. Through a web-based interface, a member of the online dating community enrolls in the personal security service, enters a default telephone number to which the service is to direct communications during the security period, and selectively provides additional personal information about himself/herself, such as the member's physical description (e.g., gender, height, weight, eye color, hair color, and unique physical identifiers, such as a birthmark or tattoo), and photograph(s). The member may upload a list of contacts to the personal security service. The list of contacts may be comprised of names (e.g., legal name and/or nickname) and contact information (e.g., telephone number(s) and/or email address(es)) of people the member would like to designate as recipients of a voice message if a security event trigger is detected during a security period. The list of contacts may be further comprised of names and contact information of the member's friends, acquaintances, or colleagues. The member may optionally specify his/her relationship to a contact (e.g., contact is the member's roommate). The list of contacts may be modified by the member at any time following his/her enrollment as a subscriber of the personal security service. In some implementations, the member enters information for each contact of the list through the web-interface. In other implementations, the service is operable to enable the member to selectively sync the subscriber's list of contacts with the "Address Book" of his/her wireless mobile device, the "Contacts" portion of a desktop application (e.g., Microsoft Outlook® available from Microsoft Corporation), and/or the member's social network contacts (e.g., Facebook Friends).

Once enrolled, the member of the online dating community (now known to the online dating service as a personal security service subscriber) is provided with instructions on accessing and utilizing the service.

In some examples, the personal security service supports a mode that can be used when a subscriber expects to be at some risk for an upcoming interval of time. For example, a subscriber may feel at risk meeting another member of the online dating community for the first time. Some examples of such a mode use a "check in time"-based approach. Generally, the subscriber initiates a security period with the personal security service by specifying a "check in" time by which the subscriber needs to deactivate the security period, else the personal security service will deem the subscriber to be at risk and forward a voice message recorded by the subscriber that includes itinerary-related information to one or more subscriber-specified recipients.

In one example, a member of the online dating community at a desktop computer signs into the online dating service by providing a valid username and password combination in a log in page of a website. Once the member is signed in, the member navigates to a "personal security service" portion of the online dating service website and initiates a security period by entering a screen name of the online dating community member she has a date with and selecting a "New security period" button. This action causes the personal security service portion of the website to prompt the member to provide a voice message including itinerary-related information by displaying the following exemplary text: "Please leave a brief message clearly stating the time and location at which you will be meeting [screen name of the online dating community member]. If you have further information about where you and [screen name of the online dating community member] will be heading after you meet up, please also provide that now." The personal security service portion of the website may be operable to record any audio provided by the member through a voice input component (e.g., a microphone) of her desktop computer, or alternatively, enable the member to upload a prerecorded voice message. Once the personal security service portion of the website receives a confirmation from the member that the recorded voice message is ready for use (e.g., through a selection of a "Yes, please use this voice message" button), the personal security service portion of the website prompts the member to specify a "check in time" and designate one or more individuals in her list of contacts as recipients of the voice message in the event she does not "check in" by the specified time. The personal security service portion of the website may be operable to enable the member to specify recipient contact priorities and conditions, e.g., "Contact my roommate if I don't check in by the specified time. If you do not receive a response from my roommate within 30 minutes, contact my mother. If you do not receive a response from my mother within 30 minutes, contact the local authorities." Once the member has recorded a voice message, specified a check in time, and designated one or more voice message recipients, the process of setting up a "New security period" is complete.

The subscriber may deactivate the security period any time prior to the specified check in time by sending a "deactivation" communication to the personal security service (e.g., texting a "deactivation" PIN number uniquely associated with the subscriber to a short code). In the absence of a receipt of a "deactivation" communication from the subscriber at the specified check in time, the personal security service sends a communication (e.g., a SMS-based message) to the default telephone number (provided by the subscriber during enrollment) to prompt the subscriber to deactivate the alarm. If the subscriber has not checked back in within a predefined interval (e.g., 5 minutes after the specified check in time), the personal security service starts notifying the recipients of the emergency situation in the manner specified by the subscriber.

Generally, the personal security service forwards only the recorded voice message and some subscriber-related information (e.g., a telephone number and a photograph) to the recipients. The personal security service may further release to law enforcement authorities any information provided by the subscriber during enrollment in the online dating service and/or the personal security service, collected by the online dating service and/or the personal security service in the course of the subscriber's interactions with the services' websites, and any information associated with the screen name of the person the subscriber planned to meet during the security period, if deemed appropriate or necessary by law, court order or other government or law enforcement authority.

3 Second University Community Context

The personal security system 100 of FIG. 1 may further include electronic access control consoles 114 (e.g., proximity card readers) located at the doors of buildings on campus. Each university community member is issued a proximity card that specifies which buildings and/or portions of buildings that member has permission to access. The proximity card has a serial number that uniquely identifies the holder of the proximity card based on campus database records 118. In some implementations, each electronic access control console 114 of the personal security system 100 has or is otherwise in electronic communication with an intercom component (e.g., a fixed microphone/speaker unit). As a personal security service subscriber leaves a building (e.g., a dormitory), the subscriber may hold her proximity card against the proximity card reader to initiate a security period and identify herself to the personal security service. Through the intercom component, the subscriber confirms her identity and leaves a voice message that includes her itinerary-related information. For example, the subscriber may leave the following voice message: "I am heading to Zachry for my 10 am class. After class, I'll head to Sbisa for lunch. I'm meeting Jane Smith at the rec center at 2:30 to work out. I'll be at the office from 4:30 to 7. I'll be back in my dorm by 8 pm."

The personal security system 100 identifies the subscriber's starting point of her itinerary based on a lookup of the location of the electronic access control on the campus. The personal security system 100 then processes the itinerary-related information of the voice message against a dictionary of known physical locations on the campus to identify the various intermediary points and the destination point on her itinerary for the security period. For example, the system 100 may process the words "Zachry," "Sbisa," and "rec center" against a non-subscriber-specific list of campus locations (e.g., a community dictionary 120), and process the words "my dorm," and "the office" against a subscriber-specific list of campus locations (e.g., a subscriber-specific dictionary 122). In some examples, the subscriber explicitly defines (e.g., during the enrollment process) the manner in which words, such as "my dorm" and "my office" are to be resolved to campus locations. In other examples, the personal security system infers those campus locations based on the subscriber's campus residence address and campus work address provided in the subscriber's campus database record(s) 118. The personal security system 100 further processes the itinerary-related information of the voice message to identify subscriber-specified "check in" times and associate such "check in" times with the corresponding itinerary points.

In one implementation, each instance in which the subscriber's proximity card is within the field of a proximity card reader results in an electronic breadcrumb. The proximity card may be actively placed within the field of a proximity card reader (e.g., the proximity card is held against the card reader associated with a check out line of the campus dining facility or the campus library self-check out system) or passively placed within the field of a proximity card reader (e.g., the proximity card is in the subscriber's book bag as she passes through the doors of a campus building). The personal security system may be implemented to compare the electronic breadcrumbs left behind by the subscriber against the itinerary-related information to determine whether the subscriber's actions are consistent with the itinerary (in terms of times and/or locations) she has specified. If the subscriber's actions deviate from her specified itinerary beyond a predefined threshold (e.g., time to reach destination, or distance from expected path), the service may send a SMS-based text message to prompt the subscriber to actively check in with the service and confirm her safety. In the absence of a receipt of an "I'm safe" confirmation, the service may be implemented to process the itinerary-related information against the subscriber's list of contacts and one or more community directories 120 (e.g., campus phone directory) to determine whether additional information associated with "Jane Smith" is available, e.g., telephone number, photograph, campus address. The service forwards to the campus police department the recorded voice message, location information corresponding to the last electronic breadcrumb available to the service, some information about the subscriber that may be useful to the campus police officers, for example, the subscriber's name, physical description (e.g., gender, height, weight, eye color, hair color, and unique physical identifiers, such as a birthmark or tattoo), and photograph(s), and if available, Jane Smith's information. The campus police department will attempt to interact with the subscriber, for example, by calling the subscriber's mobile access terminal to establish person-to-person communication, and/or by dispatching personnel to the subscriber's last known location to provide assistance. The campus police department may also attempt to interact with the subscriber's itinerary-related companion (i.e., Jane Smith) and when appropriate, notify other security organizations, such as a local police department, to help handle the situation.

4 Other Examples and Contexts

The personal security system may be implemented to generate a visual representation of a candidate route between the starting point and the destination point of a subscriber-specified itinerary. In some examples, the visual representation is delivered to an end user access terminal associated with the subscriber for verification. Upon confirmation of the candidate route as the prescribed route to be traversed by the subscriber, the visual representation of the candidate route is associated with the security period. In other example, the visual representation is automatically associated with the security period without an explicit confirmation by the subscriber. In the event of an emergency situation, the visual representation of the candidate route associated with the security period may be forwarded to the appropriate recipients along with the voice message and other pertinent itinerary-related information. In other examples, the visual representation is generated only in the event of an emergency situation. The visual representation may be generated by a server-side computing device (e.g., by the application server 102) and/or a client-side computing device (e.g., an access terminal 104) based on a processing of the personalized message that is held in escrow during the security period.

In some examples, when a subscriber initiates an at-risk interval, the application server may initially inform the security service and provide location information obtained from the LBS on an ongoing basis. The security service can maintain a display, for example showing their locations on a map, of users as they travel. In some examples, subscribers may have the option of permitting or denying such tracking, for example, for privacy reasons. A concentration of subscribers in a particular area may be addressed by dispatching preventive patrols into the area. Also, historical information may be logged, for example, to identify areas and time in which subscribers feel at risk or in which incidents actually occur. Such historical information may used, for example, to improve subscribers' sense of security in those areas, for example though physical improvements (e.g., lighting) or increased patrols.

In some examples, the security period may be defined using other and/or additional criteria than time duration or end time. For example, a subscriber may identify a route (e.g., using a destination building number) and the security period is defined as the time until the user reaches the destination. In such an example, the end of the security period may be defined by the server as a reasonable time needed to reach the destination. In some examples, the application server may determine that there may be a possible security condition if the subscriber deviates significantly from a path to the declared destination. In some examples, the end of the security period may be defined by a deployment of an airbag in a vehicle or a detection of a home break in.

In some examples, security periods may be initiated or defined by entities other than the user. For example, a parent may require that a child check in at a particular time (e.g., at midnight) or at a set of prespecified times (e.g., every two hours). In addition or instead of notifying a security service, the parent may be notified if the child fails to check in. That is, the parent may serve the role of the security service. Similarly, an elderly parent may need to check in periodically or else their adult child or other caregiver is notified with information about their location. In some examples, a child may initiate the security period with the parent being notified if they fail to terminate the period or check in when prompted.

In some examples, a security period may be initiated by a passive activity of the user. For example, a system may detect that a subscriber has entered a predefined geographic area (e.g., going off campus, leaving a nursing home) and may have to check in within a certain period of time (e.g., within one hour).

In some examples, the subscriber's community security service is notified regardless of the subscriber's geographic location. For example, a user from a university in California may be visiting New York City yet their security-related notifications are sent back to California. This approach can permit their university security service to provide additional information to local New York police. In other examples, the security service that is notified may depend on the subscriber's geographic location. For example, universities may cooperate and a student visiting another university's campus may result in a notification to the security service of the visited university in addition or instead of the subscriber's home university.

Other examples of communities may be served by examples of the system. For example, personnel on a military base, a special interest group, a church group, residents of a housing development, inhabitants of cities, towns, hotel guests, corporations, etc. can each form a community served by an example of a personal security system.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
receiving a first communication indicative of an initiation of a security period associated with a personal security service subscriber;
receiving a personalized message including voice content provided by the subscriber;
maintaining the personalized message in an escrow storage during the security period;
processing the voice content of the personalized message to derive one or more text-based elements;
generating information characterizing an itinerary of the subscriber during the security period based in part on a comparison of the derived one or more text-based elements against a dictionary of known physical locations, wherein the itinerary includes a starting point, a destination point, and a candidate route between the starting point and the destination point;
causing a visual representation of the candidate route to be presented to the subscriber for confirmation; and
delivering the personalized message, information characterizing the visual representation of the candidate route, or both, to one or more recipients upon determining an occurrence of a security event including deviation from the itinerary during the security period associated with the subscriber.

2. The computer-implemented method of claim 1, wherein the personalized message further comprises content of one or more of the following content forms: text, audio, still images, animation, and video.

3. The computer-implemented method of claim 1, wherein receiving the first communication comprises:
receiving valid security service subscriber login information.

4. The computer-implemented method of claim 1, wherein receiving the first communication comprises:
receiving a signal representative of a time interval selection.

5. The computer-implemented method of claim 4, further comprising:
associating contents of the escrow storage with a security event trigger that is defined in part by the time interval selection.

6. The computer-implemented method of claim 1, wherein the occurrence of the security event corresponds to an end condition of the security period.

7. The computer-implemented method of claim 6, wherein the end condition of the security period corresponds to an expiration of a subscriber-specified timer.

8. The computer-implemented method of claim 7, further comprising:
prior to the expiration of the subscriber-specified timer, delivering a warning notification to prompt the subscriber to terminate the security period; and
delivering the personalized message, the information characterizing the visual representation of the candidate route, or both, to the one or more predetermined recipients if the subscriber-specified timer expires prior to a receipt of a second communication indicative of a termination of the security period associated with the subscriber.

9. The computer-implemented method of claim 1, further comprising:
identifying a signal representative of a subscriber-initiated emergency notification as a security event trigger; and
delivering the personalized message, the information characterizing the visual representation of the candidate route, or both, to the one or more predetermined recipients upon detecting a signal representative of a subscriber-initiated emergency notification.

10. The computer-implemented method of claim 1, further comprising:
identifying each of a plurality of prespecified check in times as a respective security event trigger; and
delivering the personalized message, the information characterizing the visual representation of the candidate route, or both, to the one or more predetermined recipients upon detecting a violation of at least one of the plurality of security event triggers.

11. The computer-implemented method of claim 1, further comprising:
generating an estimated time of arrival based in part on the candidate route; and
identifying a due time calculated from the estimated time of arrival as the security event trigger.

12. The computer-implemented method of claim 1, further comprising:
delivering the information characterizing the visual representation of the candidate route to an access terminal associated with the subscriber; and
receiving a second communication indicative of the confirmation of the candidate route as a prescribed route to be traversed by the subscriber.

13. The computer-implemented method of claim 1, further comprising:
receiving information identifying an itinerary-related companion;
maintaining the information identifying the itinerary-related companion in the escrow storage during the security period; and
delivering the information identifying the itinerary-related companion and at least one of the personalized message and the information characterizing the visual representation of the candidate route to the one or more predetermined recipients upon detection of a security event during the security period.

14. The computer-implemented method of claim 1, further comprising:
processing the voice content of the personalized message against one or more directories of candidate identifiers to identify an itinerary-related companion; and
delivering the information identifying the itinerary-related companion and at least one of the personalized message and the information characterizing the visual representation of the candidate route to the one or more predetermined recipients upon detection of a security event during the security period.

15. The computer-implemented method of claim 1, further comprising:
delivering profile information associated with the subscriber to the one or more predetermined recipients.

16. The computer-implemented method of claim 1, wherein the first communication is received from one of the following: an access terminal associated with the subscriber and a dedicated access terminal at a physical location associated with the subscriber.

17. The computer-implemented method of claim 1, further comprising:
receiving a second communication indicative of a termination of the security period associated with the subscriber; and
removing contents associated with the subscriber from the escrow storage.

18. The computer-implemented method of claim 17, wherein the first communication and the second communication are received from different access terminals.

19. A non-transitory machine-readable medium that stores executable instructions to cause a machine to:
receive a first communication indicative of an initiation of a security period associated with a personal security service subscriber;
receive a personalized message including voice content provided by the subscriber;
maintain the personalized message in an escrow storage during the security period;
process the voice content of the personalized message to derive one or more text-based elements;
generate information characterizing an itinerary of the subscriber during the security period based in part on a comparison of the derived one or more text-based elements against a dictionary of known physical locations, wherein the itinerary includes a starting point, a destination point, and a candidate route between the starting point and the destination point;
cause a visual representation of the candidate route to be presented to the subscriber for confirmation; and
deliver the personalized message, information characterizing the visual representation of the candidate route, or both, to one or more recipients upon determining an occurrence of a security event including deviation from the itinerary during the security period associated with the subscriber.

20. The machine-readable medium of claim 19, wherein the personalized message further comprises content of one or more of the following content forms: text, audio, still images, animation, and video.

21. The machine-readable medium of claim 19, further comprising instructions to cause the machine to:
associate contents of the escrow storage with a security event trigger that is defined in part by a subscriber-specified time interval selection.

22. The machine-readable medium of claim 19, wherein the occurrence of the security event corresponds to an end condition of the security period.

23. The machine-readable medium of claim 19, wherein the end condition of the security period corresponds to an expiration of a subscriber-specified timer.

24. The machine-readable medium of claim 23, further comprising instructions to cause the machine to:

deliver a warning notification to prompt the subscriber to terminate the security period prior to the expiration of the subscriber-specified timer; and deliver the personalized message, the information characterizing the visual representation of the candidate route, or both, to the one or more predetermined recipients if the subscriber-specified timer expires prior to a receipt of a communication indicative of a termination of the security period.

25. The machine-readable medium of claim 19, further comprising instructions to cause the machine to:

identify a signal representative of a subscriber-initiated emergency notification as a security event trigger; and deliver the personalized message, the information characterizing the visual representation of the candidate route, or both, to the one or more predetermined recipients upon receipt of a signal representative of a subscriber-initiated emergency notification.

26. The machine-readable medium of claim 19, further comprising instructions to cause the machine to:

identify each of a plurality of prespecified check in times as a respective security event trigger; and deliver the personalized message, the information characterizing the visual representation of the candidate route, or both, to the one or more predetermined recipients upon detecting a violation of at least one of the plurality of security event triggers.

27. The machine-readable medium of claim 19, further comprising instructions to cause the machine to:

generate an estimated time of arrival based in part on the candidate route; and identify a due time calculated from the estimated time of arrival as the security event trigger.

28. The machine-readable medium of claim 19, further comprising instructions to cause the machine to:

receive information identifying an itinerary-related companion;

maintain the information identifying the itinerary-related companion in the escrow storage during the security period; and deliver the information identifying the itinerary-related companion and at least one of the personalized message and the information characterizing the visual representation of the candidate route to the one or more predetermined recipients upon detection of a security event during the security period.

29. The machine-readable medium of claim 19, further comprising instructions to cause the machine to:

process itinerary-related information of the personalized message against one or more directories of candidate identifiers to identify an itinerary-related companion; and deliver the information identifying the itinerary-related companion and at least one of the personalized message and the information characterizing the visual representation of the candidate route to the one or more predetermined recipients upon detection of a security event during the security period.

30. The machine-readable medium of claim 19, further comprising instructions to cause the machine to:

remove contents associated with the subscriber from the escrow storage responsive to a receipt of a signal indicative of a termination of the security period associated with the subscriber.

31. A system comprising:

an application server having a processor and a memory that stores instructions to cause the processor to:

maintain a personalized message including voice content provided by a personal security service subscriber in an escrow storage during a security period associated with the subscriber;

process the voice content of the personalized message to derive one or more text-based elements;

generate information characterizing an itinerary of the subscriber during the security period based in part on a comparison of the derived one or more text-based elements against a dictionary of known physical locations, wherein the itinerary includes a starting point, a destination point, and a candidate route between the starting point and the destination point;

cause a visual representation of the candidate route to be presented to the subscriber for confirmation; and deliver the personalized message, information characterizing the visual representation of the candidate route, or both, to one or more recipients upon determining an occurrence of a security event including deviation from the itinerary during the security period associated with the subscriber.

* * * * *